United States Patent

Bonnett et al.

Patent Number: 6,061,043
Date of Patent: May 9, 2000

[54] LIQUID CRYSTAL DISPLAY HAVING GREY LEVELS WITH REDUCED VARIATIONS DUE TO TEMPERATURE AND LIQUID CRYSTAL VARIATIONS

[75] Inventors: Paul Bonnett; Michael John Towler, both of Oxford, United Kingdom; Akira Tagawa, Chiba, Japan

[73] Assignee: Sharp Kabushiki Kaisha, Osaka, Japan

[21] Appl. No.: 08/801,549

[22] Filed: Feb. 18, 1997

[30] Foreign Application Priority Data

Feb. 20, 1996 [GB] United Kingdom .................. 9603506

[51] Int. Cl.[7] .......................................... G09G 3/36
[52] U.S. Cl. ........................... 345/89; 345/149; 349/96
[58] Field of Search ......................... 345/87, 89, 101, 345/103, 97, 32, 63, 85, 148, 149; 349/96, 97, 98, 99, 100, 101, 102, 103

[56] References Cited

U.S. PATENT DOCUMENTS

| | | | |
|---|---|---|---|
| 5,235,449 | 8/1993 | Imazeki et al. | 359/63 |
| 5,327,285 | 7/1994 | Faris | 359/483 |
| 5,675,351 | 10/1997 | Kaneko et al. | |
| 5,686,975 | 11/1997 | Lipton | 349/15 |
| 5,717,522 | 2/1998 | Hattori et al. | 359/465 |
| 5,751,479 | 5/1998 | Hamagishi et al. | 359/464 |

FOREIGN PATENT DOCUMENTS

| | | |
|---|---|---|
| 0453856 | 10/1991 | European Pat. Off. . |
| 0526095 | 2/1993 | European Pat. Off. . |
| 0687937 | 12/1995 | European Pat. Off. . |
| 0721132 | 7/1996 | European Pat. Off. . |
| 63-274921 | 11/1988 | Japan . |
| 5-27719 | 2/1993 | Japan . |
| 2294797 | 5/1996 | United Kingdom . |
| 2296099 | 6/1996 | United Kingdom . |

OTHER PUBLICATIONS

European Search Report related to European Patent Application No. 97301054.9 dated Sep. 10, 1998.

Primary Examiner—Steven J. Saras
Assistant Examiner—Srilakshmi K Kumar
Attorney, Agent, or Firm—Renner, Otto, Boisselle & Sklar

[57] ABSTRACT

A liquid crystal display which includes a matrix of pixels, for instance formed at the intersections of data electrodes and split strobe electrodes. Each pixel is divided into first and second sub-pixels. The first sub-pixels have input and output polarisers whose polarization directions are parallel, whereas the second sub-pixels have input and output polarisers whose polarization directions are orthogonal. In order to address and achieve grey levels with reduced variations due to temperature variations and liquid crystal variations, the sub-pixels are switched to a grey level in accordance with a spatial averaging technique. Variations in the grey levels of the sub-pixels, for instance caused by temperature variations, act in opposite directions so that the average grey level of the whole pixel varies relatively little.

9 Claims, 4 Drawing Sheets

LIQUID CRYSTAL DISPLAY HAVING GREY LEVELS WITH REDUCED VARIATIONS DUE TO TEMPERATURE AND LIQUID CRYSTAL VARIATIONS

TECHNICAL FIELD OF THE INVENTION

The present invention relates to a display, such as a liquid crystal display (LCD).

BACKGROUND OF THE INVENTION

A known type of LCD panel comprises a matrix of picture elements (pixels), each of which is located at the intersection of a strobe electrode and a data electrode. Displays of this type may use a ferroelectric liquid crystal (FLC) and, by applying suitable data and strobe signals, it is possible to display one or more grey levels having light transmissivity or reflectivity between minimum and maximum values which are referred to as black and white levels. This technique for achieving grey levels (by analogue means) may be used alone or in combination with spatial and/or temporal techniques for providing grey levels. It is thus possible to provide a large number of grey levels so as to increase the utility and range of applications of panel displays of this type.

A difficulty of achieving grey levels with displaces of this type is that the grey levels are sensitive to variations in temperature, panel thickness i.e. thickness of the liquid crystal layer, and pixel pattern i.e. variations in switching sensitivity of each pixel as a result of data signals applied to other pixels. In the absence of compensation, temperature variations cause the grey levels to vary from the levels expected of the data signals. Although techniques are known for compensating for large scale changes in temperature affecting the whole of a display panel, grey levels are so sensitive to temperature variation that small temperature variations over the display area can have a substantial effect on grey levels. Similarly, relatively small thickness variations in the liquid crystal layer over a small scale within the panel, for instance resulting from manufacturing tolerances, can have a substantial effect on grey levels. Such effects therefore limit the number of grey levels which can be reliably addressed and can have a detrimental effect on the quality of images displayed by the display.

JP-A-5-27719 discloses a ferroelectric liquid crystal display of the pixellated type. Each pixel is physically divided into two sub-pixels whose optical properties are individually controllable. In order to switch a pixel to a desired grey level, one of the sub-pixels is blanked to white and then switched from the white state so as to try to achieve the desired grey level. The other sub-pixel is blanked to black and then similarly switched so as to try to achieved the desired grey level. However, the effects of temperature variations and differences in thickness of the ferroelectric liquid crystal result in shifts of the function relating optical transmissivity to switching waveform. Both sub-pixels are affected in the same way but, because the sub-pixels are initially blanked to opposite states before being switched towards the desired grey level, the effects of such variations at least partially cancel out and the perceived grey level of the whole pixel is made substantially less dependent on variations, for instance in temperature or ferroelectric liquid crystal thickness. In particular, an effect which tends to make the grey level achieved by one sub-pixel darker than expected tends to make the other sub-pixel lighter than expected.

The arrangement disclosed in JP-A-27719 is capable of compensating for temperature variations and variations in liquid crystal thickness for bistable liquid crystals such as ferroelectric liquid crystals. However, this arrangement is unsuitable for non-bistable liquid crystals, which suffer from similar problems of sensitivity to temperature and liquid crystal thickness.

SUMMARY OF THE INVENTION

According to the invention, there is provided a liquid crystal display comprising a plurality of pixels, each of which is spatially divided to form a first sub pixel and a second sub-pixel, and a control arrangement for selectively switching each pixel to an intermediate optical state between a maximum attenuation optical state and a minimum attenuation optical state by switching the first and second sub-pixels to the intermediate optical state, characterised in that each of the first sub-pixels has input and output linear polarisers whose polarisation directions are parallel and each of the second sub-pixels has input and output linear polarisers whose polarising directions are orthogonal.

It is thus possible to use a spatial averaging technique to eliminate or reduce grey level variations caused by temperature variations and liquid crystal thickness variations with non-bistable liquid crystals. For instance, this technique may be applied to displays operating in RMS responding nematic modes such as twisted nematic and supertwisted nematic liquid crystals.

Preferably the display comprises a spatially uniformly polarising layer forming one of the input and output polarisers of the first and second sub-pixels. The use of only one patterned polariser avoids the cost of a second patterned polariser and avoids any manufacturing difficulty which might be associated with registration of two patterned polarisers.

Preferably the display comprises a spatially non-uniformly polarising layer leaving alternating elongate first and second regions forming the other of the input and output polarisers, the first and second regions being aligned with the first and second sub pixels, respectively. This provides a particularly simple patterned polariser which is thus easier to manufacture.

Preferably the first and second regions of each adjacent pair are aligned with first and second sub-electrodes of a respective addressing electrode.

Preferably each of the pixels comprises first and second display regions forming the first and second sub-pixels, respectively.

Preferably the first and second sub-pixels are independently addressable. The control arrangement may be arranged to refresh the first and second sub-pixels of each pixel simultaneously. Alternatively, the control arrangement may be arranged to refresh the first and second sub-pixels of each pixel sequentially.

BRIEF DESCRIPTION OF THE DRAWINGS

The Invention will be further described by way of example, with reference to the accompanying drawings, in which.

DETAILED DESCRIPTION OF THE INVENTION

Figure 1:
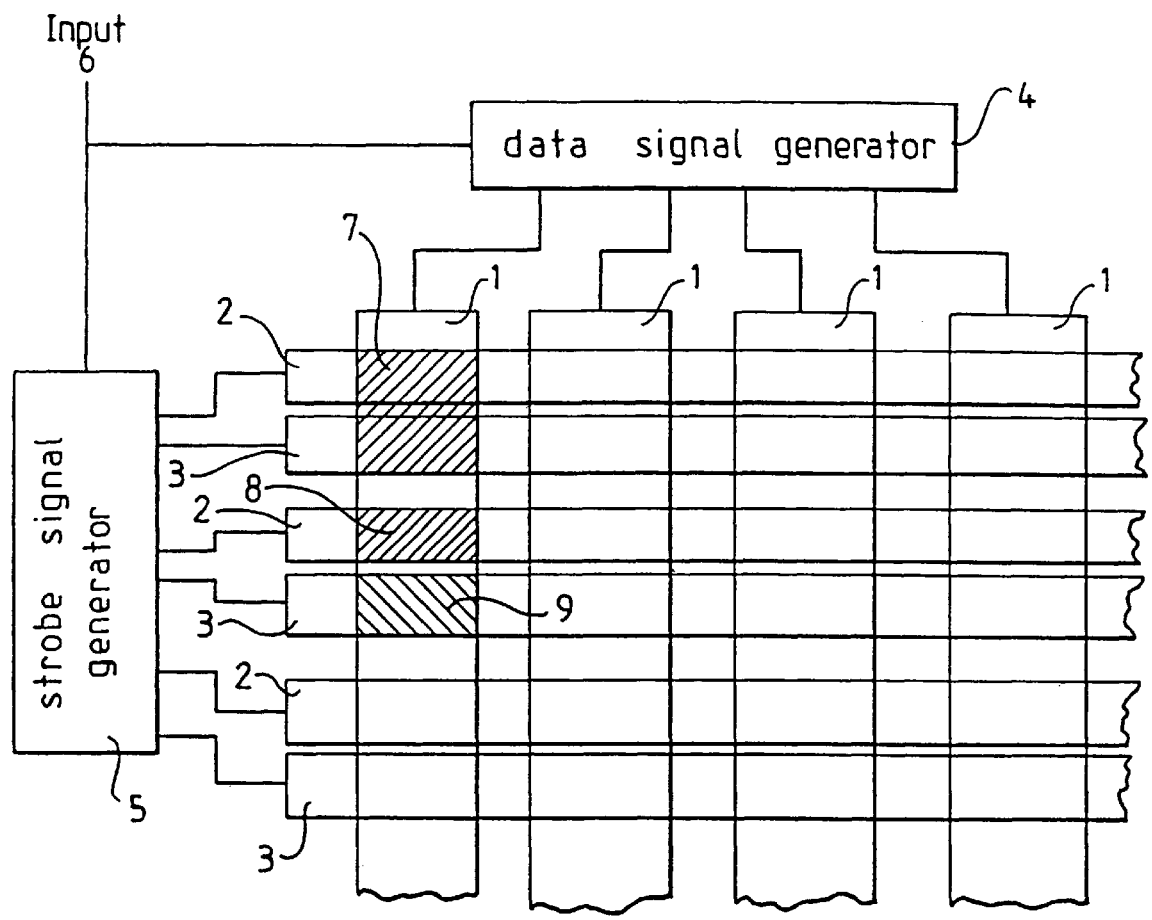
FIG. 1 is a schematic diagram of a liquid crystal display constituting an embodiment of the invention.

FIG. 1 shows part of an LCD comprising a matrix of pixels formed at the intersections of data on column electrodes 1 and strobe or row electrodes 2 and 3. The data electrodes 1 are connected to a data signal generator 4 and the strobe electrodes 2 and 3 are connected to a strobe signal generator 5. The data and strobe signal generators 4 and 5 are connected to a display input 6 which supplies image data to the data signal generator 4 and clock signals to the generators 4 and 5.

Compared with known matrix-type LCDs the strobe electrodes for each row of pixels are divided into two electrodes 2 and 3. Each pixel, such as that indicated by shading at 7, is defined bow the intersection of one of the data electrodes 1 and an adjacent pair of the strobe electrodes 2 and 3. The pixels are divided into first and second sub-pixels, such as those indicated by different directions of shading at 8 and 9, by the intersections of the data electrodes and the split strobe electrodes 2 and 3, respectively.

Figure 2:
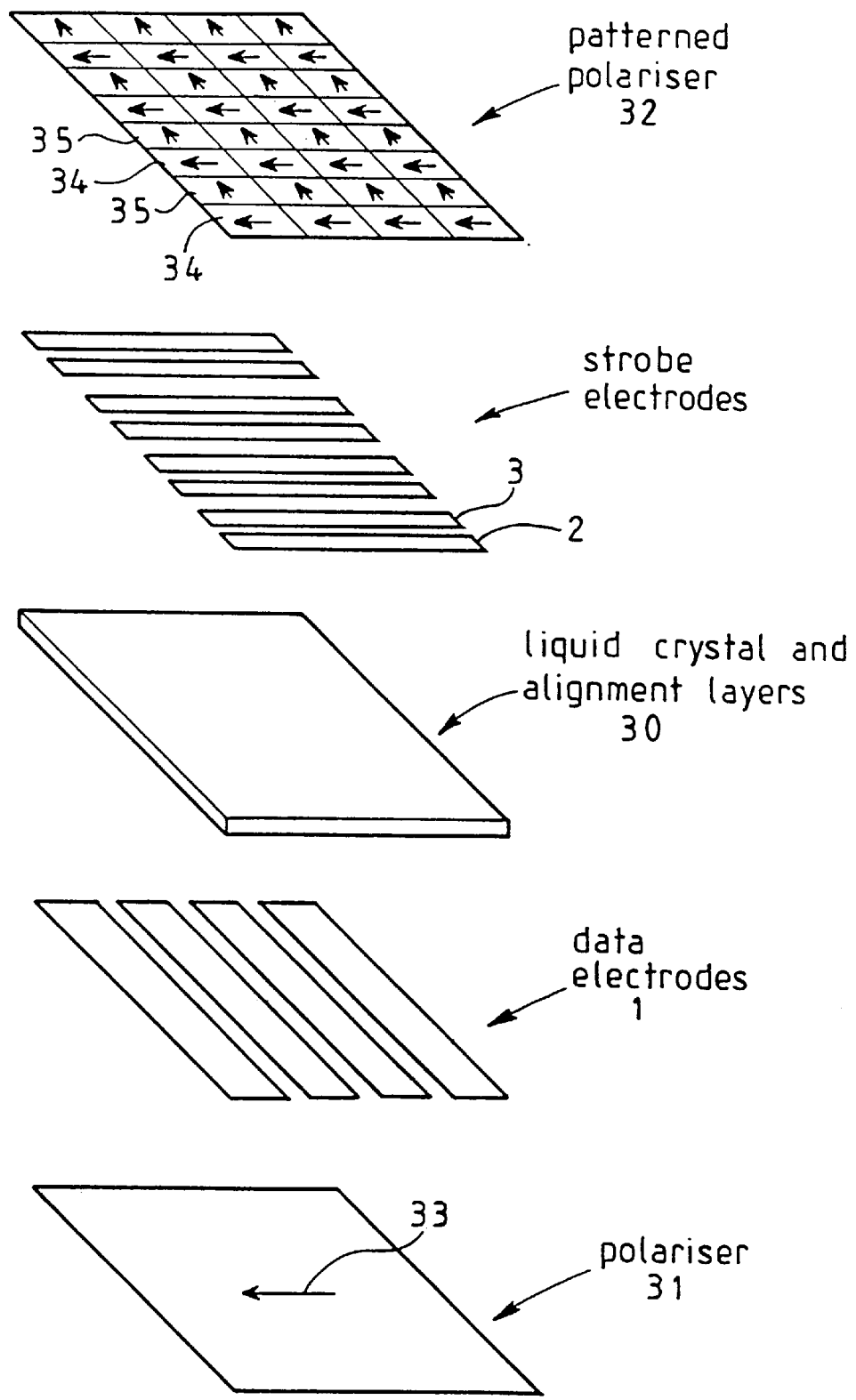
FIG. 2 is a schematic exploded diagram of the display of FIG. 1.

The display further comprises a layer of twisted nematic or super twisted nematic liquid crystal material disposed between appropriate alignment layers as indicated at 30 in FIG. 2. A plane polariser 31 having a polarisation direction indicated by the arrow 33 is disposed on one side of the liquid crystal and alignment layers 30 whereas a patterned polariser 32 is disposed on the other side. The patterned polariser 32 comprises strips 34 and 35 which are aligned with the strobe electrodes 2 and 3, respectively. The polarisation direction of the strips 34 is parallel to the polarisation direction 33 of the polariser 31 whereas the polarisation direction of the strips 35 is perpendicular thereto.

The patterned polariser 32 may be made using polymerisable films, for instance as disclosed in U.S. Pat. No. 5,235,449. A molecular film is coated onto a surface and polymerised in a predetermined pattern. The unpolymerised material is then removed to leave regions with polarisations in different directions.

Alternatively, the patterned polariser 32 may comprise a continuous polariser and a patterned polarisation rotator. Such an arrangement is disclosed in GB 2 296 099 and EP 0 721 132.

The pixels of the display are thus spatially divided into sub-pixels with the sub-pixels 8 aligned with the strips 34 operating in the normally black mode whereas the sub-pixels 9 aligned with the strips 35 operate in the normally white mode.

Figure 3:
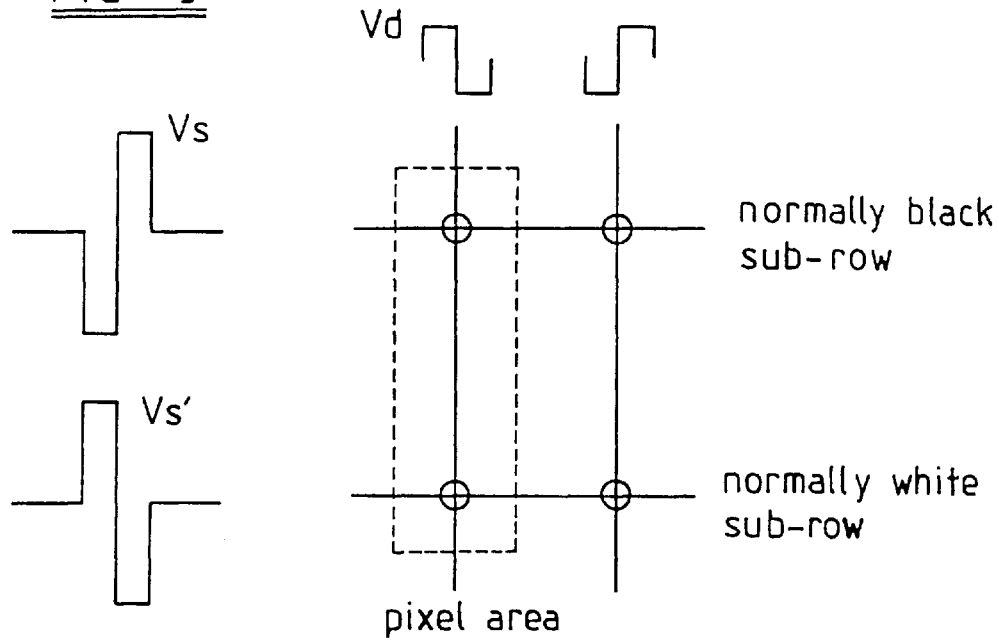
FIG. 3 illustrates strobe and data waveforms which may be used in the display of FIGS. 1 and 2.
Figure 4:
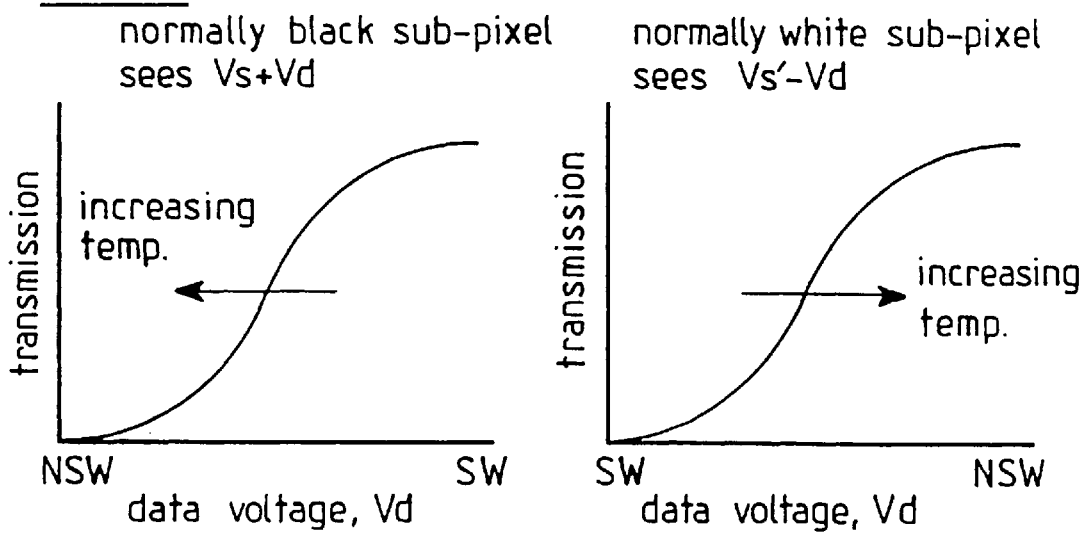
FIG. 4 shows graphs of light transmission against data waveforms for first and second sub-pixels of the display of FIGS. 1 and 2 illustrating the effects of temperature variation.

FIG. 3 illustrates the waveforms which are applied to the electrodes 1, 2 and 3 so as to address the individual sub-pixels. Bipolar waveforms are shown but monopolar pulses may also be used. In order to select an intermediate grey level, the sub-pixels operating in the normally white mode are switched towards the black state whereas the pixels operating in the normally black mode are switched towards the white state. The liquid crystal responds to the average voltage thereacross for a frame. Thus, different grey levels may be achieved by applying data signals of different amplitudes Vd. As shown in FIG. 4, the transmission curves of the normally white and normally black sub-pixels shift in opposite directions for a particular direction of change in temperature. However, the grey levels produced by the sub-pixels are integrated by the eye of the observer who therefore perceives the average grey level for each pixel so that variations in grey level are substantially reduced.

Figure 5:
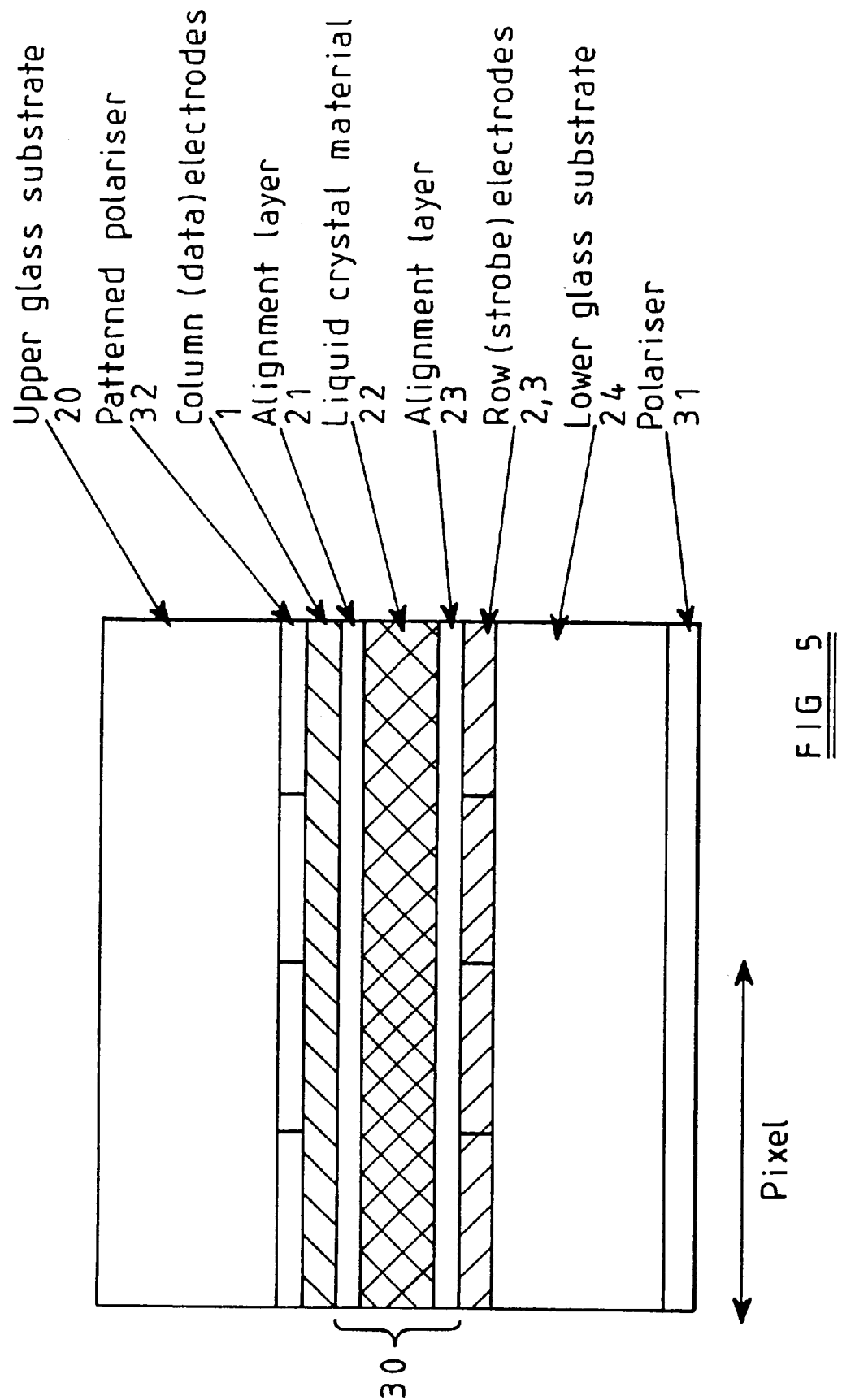
FIG. 5 is a cross-sectional view of the display of FIG. 1.

The cross-sectional view of FIG. 5 illustrates the positions of the various components of the display. The patterned polariser 32 and the data electrodes 1 are disposed between an upper glass substrate 20 and an alignment layer 21. The strobe electrodes 2, 3 are disposed between an alignment layer 23 and a lower glass substrate 24. The liquid crystal material 22 is disposed between the alignment layers 21 and 23. The patterned polariser 32 may alternatively be disposed between the data electrodes 1 and the alignment layer 22 but such an arrangement is not preferred because the polariser 32 would affect the field applied across the liquid crystal material 22. The patterned polariser 32 is disposed between the substrates 20 and 24 so that parallax effects can be substantially reduced.

The strobe waveforms may be supplied sequentially to the strobe electrodes 2 and 3 of each row of pixels. Alternatively, the strobe signals may be supplied simultaneously to the electrodes 2 and 3 of each pixel row so that both sub-pixels 8 and 9 of each pixel 7 are switched simultaneously. Such simultaneous strobing is possible when the data waveforms are such that the black and white switching waveforms switch one of the sub-pixels but not the other. Simultaneous strobing doubles the refresh rate of the display and may reduce the effects of pixel pattern.

Other known techniques are used for compensating for large scale temperature variations of the whole display panel. By using the technique described hereinbefore to compensate for changes in grey level with temperature, small scale temperature variations across the display panel can be compensated so as to reduce the variation in grey level.

This technique may be used to compensate for variations which are caused by other effects and which shift the transmission curves of the sub-pixels 8 and 9 in opposite directions. Thus, variations in grey level caused by and variations in cell thickness can be substantially reduced.

In the display described hereinbefore, it has been assumed that the sub-pixels 8 and 9 have the same display areas. However, the relative display areas of the sub-pixels may be varied so as to compensate for differences in the switching curves.

This technique may be applied to other non-bistable display types including birefringence mode displays using nematic liquid crystals and modes with different twists such as pi-cells, optical interference displays and distorted helix ferroelectric liquid crystals. Also, although passive matrix addressing has been described, this technique is also applicable to active matrix addressing. In this case, the sub-pixels may be divided in the columns rather than in the rows.

What is claimed is:

1. A liquid crystal display comprising:
   a plurality of pixels, each of which is spatially divided to form a first sub-pixel and a second sub-pixel, and;
   a control arrangement for selectively switching each pixel to an intermediate optical state between a maximum attenuation optical state and a minimum attenuation optical state by switching the first and second sub-pixels to the intermediate optical state,
   wherein each of the first sub-pixels has input and output linear polarizers whose polarization directions are parallel and each of the second sub-pixels has input and output linear polarizers whose polarizing directions are orthogonal, and
   the control arrangement selectively switches each pixel to the intermediate optical state by selectively switching attenuation optical states of the corresponding first and second sub-pixels with their respective parallel and orthogonal input and output linear polarizers as a function of the intermediate optical state.

2. A display as claimed in claim 1, further comprising a spatially uniform polarizing layer forming one of the input and output polarizers of the first and second sub-pixels.

3. A display as claimed in claim 2, further comprising a spatially nonuniform polarizing layer having alternating elongate first and second regions forming the other of the input and output polarizers, the first and second regions being aligned with the first and second sub-pixels, respectively.

4. A display as claimed in claim 3, wherein the first and second regions of each adjacent pair are aligned with first and second sub-electrodes of a respective addressing electrode.

5. A display as claimed in claim 1, wherein each of the pixels comprises first and second display regions forming the first and second sub-pixels, respectively.

6. A display as claimed in claim 1, wherein the first and second sub-pixels are independently addressable.

7. A display as claimed in claim 6, wherein the control arrangement is arranged to refresh the first and second sub-pixels of each pixel simultaneously.

8. A display as claimed in claim 6, wherein the control arrangement is arranged to refresh the first and second sub-pixels of each pixel sequentially.

9. A display as claimed in claim 1, wherein the pixels contain twisted nematic or supertwisted nematic liquid crystal.

* * * * *